W. E. GRAVES.
MOWER DUMP SEED PAN.
APPLICATION FILED MAY 29, 1917.
1,280,985.
Patented Oct. 8, 1918.
2 SHEETS—SHEET 1.
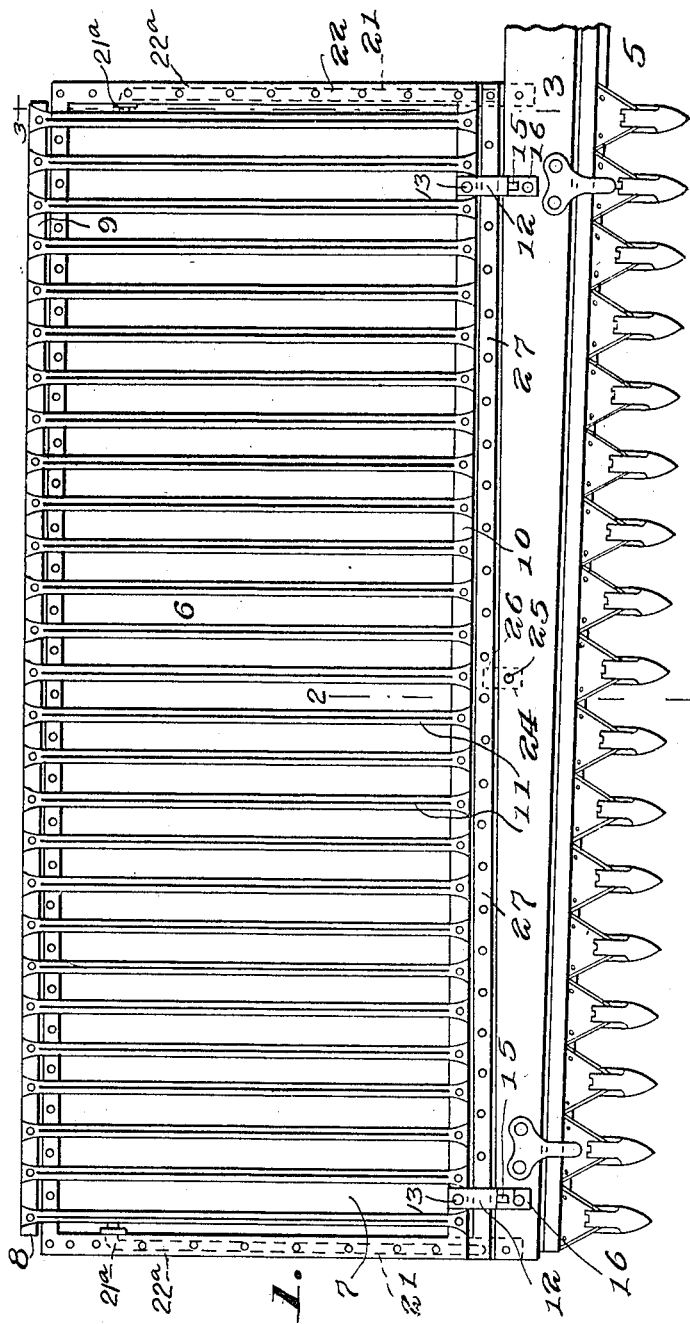
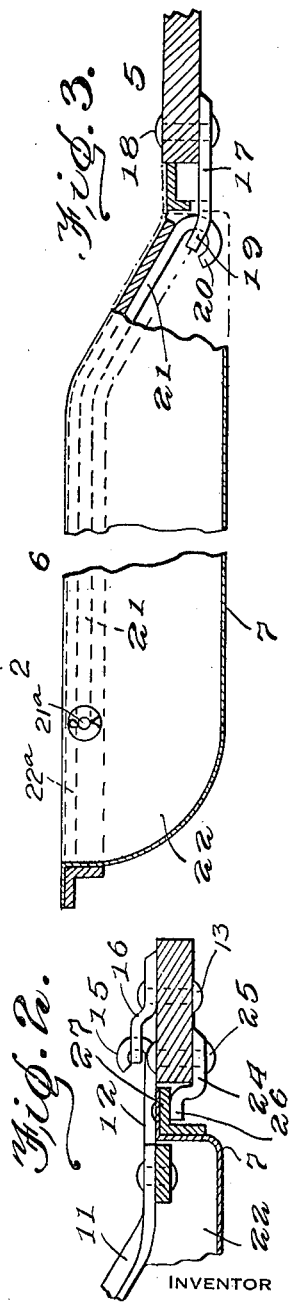
WITNESSES
H. H. Lybrand
J. Irving King
INVENTOR
W. E. Graves
BY Victor J. Evans
ATTORNEY

W. E. GRAVES.
MOWER DUMP SEED PAN.
APPLICATION FILED MAY 29, 1917.

1,280,985.

Patented Oct. 8, 1918.
2 SHEETS—SHEET 2.

WITNESSES

INVENTOR
W. E. Graves
BY Victor J. Evans
ATTORNEY

UNITED STATES PATENT OFFICE.

WILLIE EVERET GRAVES, OF UTICA, MISSISSIPPI.

MOWER DUMP SEED-PAN.

1,280,985.    Specification of Letters Patent.    Patented Oct. 8, 1918.

Application filed May 29, 1917. Serial No. 171,727.

*To all whom it may concern:*

Be it known that I, WILLIE E. GRAVES, a citizen of the United States, residing at Utica, in the county of Hinds and State of Mississippi, have invented new and useful Improvements in Mower Dump Seed-Pans, of which the following is a specification.

This invention has reference to mowers generally, comprehending particularly improvements in seed gathering attachments for mowers.

The primary object of the present invention is directed to a novel construction of means for connecting the seed gathering pan to the finger bar of the mower to facilitate the dumping of the seed from the pan in a simple and expeditious manner, without necessitating the seed being dipped from the pan by a scoop and thence emptied into a sack, as is now the customary manner.

With the above and other objects in view, the invention consists in the novel features, details of construction and combination of parts which will hereinafter be more fully set forth, illustrated in the accompanying drawings and pointed out in the appended claims.

Figure 1 is a top plan view of the pan constructed in accordance with my invention;

Fig. 2 is a section taken on line 2—2 of Fig. 1;

Fig. 3 is a section taken on line 3—3 of Fig. 1;

Figure 5:
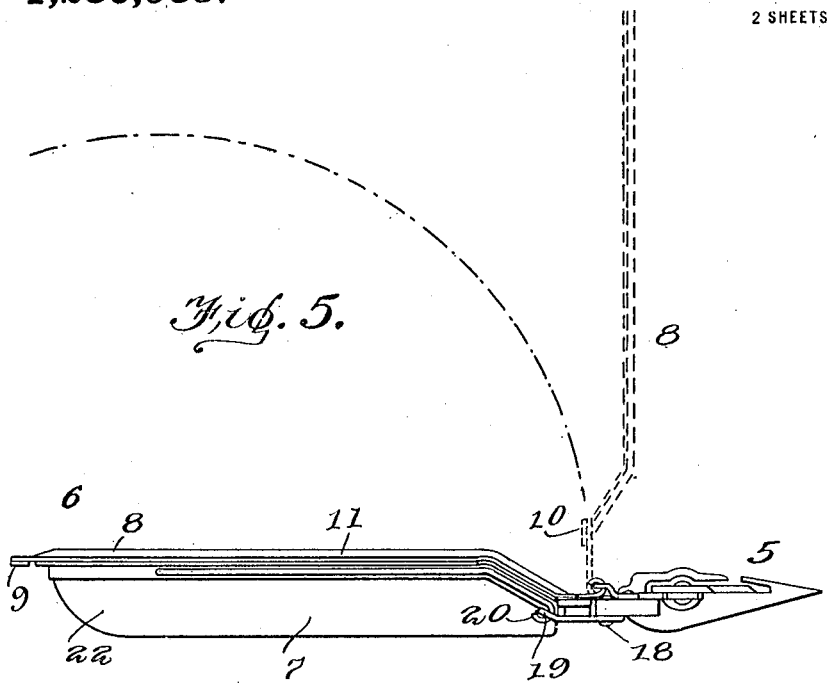
Fig. 5 is a side elevation with the raised position of the screen and seed pan shown in dotted lines.
Figure 4:
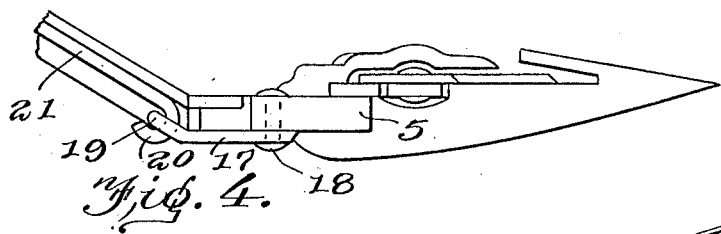
Fig. 4 is a fragmentary side elevation.
Figure 6:
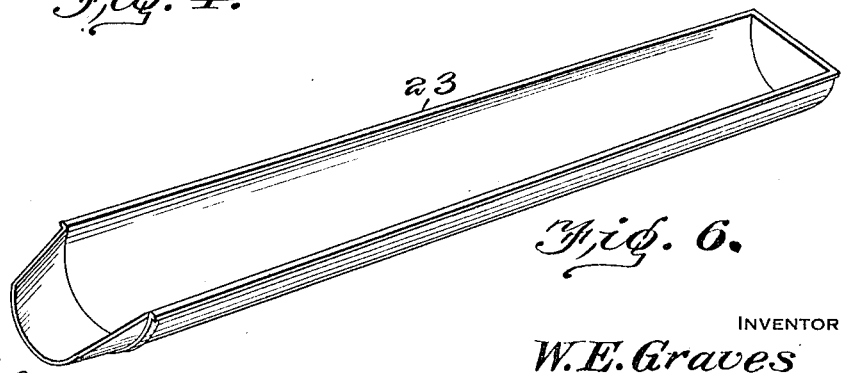
Fig. 6 is a perspective view of the scoop or pan utilized for discharging the seed into a sack or other suitable receptacle.

Referring more particularly to the accompanying drawings, in which like characters of reference refer to corresponding parts in the several views, 5 denotes the finger bar of a mower to which the seed gathering attachment denoted generally by the character 6 is hingedly connected, whereby the seed collected in the gathering pan 7 may be dumped therefrom in a convenient and expeditious manner, without necessitating considerable delay in the mowing operation of the clover.

To this end, the seed gathering attachment is preferably applicable for the gathering of clover seed and at the same time separating the seed from the clover, in order that the contents of the gathering pan 7 will contain the clover seed only, therefore, use is made of a substantially rectangular screen 8 embodying spaced parallel strips 9 and 10 connected to one another through the medium of a grating 11. A pair of rectangular plates 12 are riveted to the rail 10 of the screen as at 13, positioning the plates at right angles with respect to the strip 10 at points adjacent the opposite ends thereof, with the free ends 14 of the plates extending forwardly of said screen and terminally provided with hooked ends 15. The hooked ends 15 of each of the plates loosely engaged in a corresponding number of clips 16 secured to the finger bar 5 of the mower, serving as a hinge connection for swingingly supporting the screen to the rear edge of the finger bar for a forward vertical swinging movement.

In order to mount the gathering pan to the finger bar and to facilitate the dumping of the same without causing the screen to obstruct the tilting action of the same, I provide on the under face of the finger bar 5 at points outwardly of the spaced pair of clips 16, a second pair of spaced clips 17 and the fastening means for such clips being denoted by the character 18. This second set of clips 17, like the first mentioned set of clips 16, are terminally provided with eyes 19 for the reception of the hooked ends 20 of the spaced parallel supports 21. These supports 21 are in the form of resilient rods having pivotal connection with the ends of the pan 7 as shown at 21ª whereby the pan may have a vertical swinging movement. These rods being resilient will frictionally engage with the spaced end walls 22 of the gathering pan, beneath the flanges 22ª of the pan. When the pan is filled with the clover seed, it is only necessary that the operator swing the screen in an upward forward direction and rock the pan in a reverse or rearward direction upon the pivots 21ª, causing the contents of the pan to be discharged into a scoop 23 carried by an operator walking behind the machine for convenience in finally depositing the seed from the dump pan into a sack, not shown, in a simple and expeditious manner. After the dumping operation of the seed, the pan will fall back between the rods 21 and assume its original position for preventing any unnecessary delay in stopping the mowing operation of the clover. The supports 21 may be swung upwardly and downwardly upon the hook and eye connections 20 and 19 when desired, so that the rear edge of the pan will clear the ground when tilted.

Connected to the bottom face of the finger bar at a point approximately medially of the length of said bar, is an auxiliary support 24, secured by a rivet or the like fastening device 25. Disposing the L-shaped arm 26 thereof in contact with the under portion of the flange 27 of the gathering pan will prevent the rear end of the pan from falling onto the ground.

From the foregoing description, taken in connection with the accompanying drawings, the advantages of construction and the method of operation will be readily apparent to those skilled in the art to which the invention relates, and while I have described the principles of operation of the invention, together with the device which I now consider to be the best embodiment thereof, I desire to have it understod that the device shown is merely illustrative, and that such changes may be made when desired as are within the scope of the appended claims.

What is claimed as new, is:—

1. A seed gathering attachment for mowers, comprising a pair of spaced bars pivotally connected with the rear edge of the finger bar of the mower, said bars being upwardly and forwardly swingable, means for preventing downward swinging movement of said bars, a pan pivotally connected between the free ends of said bars and swingable upwardly and rearwardly, flanges on the opposite ends of said pan bearing upon said bars, and a forwardly and upwardly swingable grating pivotally connected with the finger bar and normally engaging upon said pan.

2. A seed gathering attachment for mowers comprising a pair of rearwardly extending bars pivotally connected with the finger bar of the mower, a pan pivotally mounted between the ends of said bars and a grating pivotally connected with said finger bar and normally resting upon the top of said pan whereby swinging movement of the pan will be prevented.

3. A seed gathering attachment for mowers, comprising a pair of rearwardly extending bars pivotally connected with the finger bar of a mower, a pan pivotally connected between the rear ends of said bars, rearwardly extending supporting members secured upon the underside of the finger bar, a flange upon the forward side of said pan engaging upon said supporting members whereby movement of said pan in one direction will be prevented, and a grate member pivotally connected with the finger bar and normally resting upon the top of said pan whereby movement of the pan in the other direction will be prevented.

In testimony whereof I affix my signature.

WILLIE EVERET GRAVES.

Copies of this patent may be obtained for five cents each, by addressing the "Commissioner of Patents, Washington, D. C."